United States Patent
Akimoto et al.

(10) Patent No.: US 12,423,344 B2
(45) Date of Patent: Sep. 23, 2025

(54) QUESTION GENERATION APPARATUS, QUESTION GENERATION METHOD, AND RECORDING MEDIUM FOR AI-ASSISTED DECISION MAKING

(71) Applicant: NEC Corporation, Tokyo (JP)

(72) Inventors: Kosuke Akimoto, Tokyo (JP); Kunihiro Takeoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/520,703

(22) Filed: Nov. 28, 2023

(65) Prior Publication Data
US 2024/0184816 A1     Jun. 6, 2024

(30) Foreign Application Priority Data
Dec. 1, 2022   (JP) ................. 2022-193134

(51) Int. Cl.
*G06F 16/00* (2019.01)
*G06F 16/338* (2019.01)

(52) U.S. Cl.
CPC ................. *G06F 16/338* (2019.01)

(58) Field of Classification Search
CPC .................................................. G06F 16/338
See application file for complete search history.

(56) References Cited

U.S. PATENT DOCUMENTS

| | | | | |
|---|---|---|---|---|
| 10,528,878 | B2 * | 1/2020 | Bruno | G06N 20/00 |
| 11,676,044 | B1 * | 6/2023 | Mazza | G06N 5/043 |
| | | | | 706/11 |
| 2014/0331241 | A1 * | 11/2014 | Barbieri | H04N 21/4758 |
| | | | | 725/24 |
| 2015/0178623 | A1 * | 6/2015 | Balani | G06N 5/025 |
| | | | | 706/48 |
| 2016/0283581 | A1 * | 9/2016 | Berajawala | G06F 16/3329 |
| 2018/0190140 | A1 * | 7/2018 | Ackermann | H04W 4/185 |
| 2018/0260472 | A1 * | 9/2018 | Kelsey | G06F 40/56 |

FOREIGN PATENT DOCUMENTS

| | | |
|---|---|---|
| JP | 2003-202892 A | 7/2003 |
| JP | 2004-110524 A | 4/2004 |
| JP | 2022-050973 A | 3/2022 |

* cited by examiner

*Primary Examiner* — Syed H Hasan
(74) *Attorney, Agent, or Firm* — Sughrue Mion, PLLC

(57) ABSTRACT

At least one processor included in a question generation apparatus carries out: an acquiring process of acquiring a plurality of character strings and pieces of text; a question generating process of generating, for each of the plurality of character strings, a question an answer to which is that character string; an ambiguity judging process of judging, for each of a plurality of questions, whether there are a plurality of answers to that question; and an outputting process of outputting a question which has been judged to be the question to which there are a plurality of answers.

9 Claims, 9 Drawing Sheets

QUESTION GENERATION APPARATUS, QUESTION GENERATION METHOD, AND RECORDING MEDIUM FOR AI-ASSISTED DECISION MAKING

CROSS REFERENCE TO RELATED APPLICATIONS

This application is based upon and claims the benefit of priority from Japanese Patent Application No. 2022-193134 filed on Dec. 1, 2022 the disclosure of which is incorporated herein in its entirety by reference.

TECHNICAL FIELD

The present invention relates to a question generation apparatus, a question generation method, and a recording medium.

BACKGROUND ART

Patent Literature 1 discloses an information processing apparatus which uses a question generator for generating a single question from a single answer, to generate a question sentence corresponding to a plurality of answers. The information processing apparatus extracts a plurality of answers from a piece(s) of text, and generates a question corresponding to the plurality of answers, the question being generated by inputting at least one of the plurality of answers to the question generator.

CITATION LIST

Patent Literature

[Patent Literature 1]
Japanese Patent Application Publication, Tokukai, No. 2022-50973

SUMMARY OF INVENTION

Technical Problem

However, the question generated by the question generator of the information processing apparatus disclosed in Patent Literature 1 is not necessarily an appropriate question, as a question corresponding to the other answers that have not been inputted to the question generator. Thus, with Patent Literature 1, there is a problem of being incapable of accurately generating a question corresponding to a plurality of answers.

An example aspect of the present invention has been made in view of the above problem, and an example object thereof is to provide a technique for accurately generating a question corresponding to a plurality of answers.

Solution to Problem

A question generation apparatus in accordance with an example aspect of the present invention includes at least one processor, and the at least one processor carries out: an acquiring process of acquiring a plurality of character strings each of which can be an answer to a question and pieces of text respectively associated with the plurality of character strings; a question generating process of generating, with reference to the pieces of text, for each of the plurality of character strings, a question an answer to which is that character string; an ambiguity judging process of judging, for each of a plurality of questions generated in the question generating process, whether there are a plurality of answers to that question; and an outputting process of outputting a question which is included in the plurality of questions generated in the question generating process and which has been judged, in the ambiguity judging process, to be the question to which there are a plurality of answers.

A question generation method in accordance with an example aspect of the present invention includes: at least one processor included in a question generation apparatus acquiring a plurality of character strings each of which can be an answer to a question and pieces of text respectively associated with the plurality of character strings; the at least one processor generating, with reference to the pieces of text, for each of the plurality of character strings, a question an answer to which is that character string; the at least one processor judging, for each of a plurality of questions generated in the generating, whether there are a plurality of answers to that question; and the at least one processor outputting a question which is included in the plurality of questions generated in the generating and which has been judged, in the judging, to be the question to which there are a plurality of answers.

A recording medium in accordance with an example aspect of the present invention is a computer-readable, non-transitory recording medium having recorded thereon a program for causing a computer to function as a question generation apparatus, and the program causes the computer to carry out: an acquiring process of acquiring a plurality of character strings each of which can be an answer to a question and pieces of text respectively associated with the plurality of character strings; a question generating process of generating, with reference to the pieces of text, for each of the plurality of character strings, a question an answer to which is that character string; an ambiguity judging process of judging, for each of a plurality of questions generated in the question generating process, whether there are a plurality of answers to that question; and an outputting process of outputting a question which is included in the plurality of questions generated in the question generating process and which has been judged, in the ambiguity judging process, to be the question to which there are a plurality of answers.

Advantageous Effects of Invention

With an example aspect of the present invention, it is possible to accurately generate a question having a plurality of answers.

EXAMPLE EMBODIMENTS

First Example Embodiment

The following description will discuss a first example embodiment of the present invention in detail, with reference to the drawings. The present example embodiment is basic to example embodiments which will be described later.
(Configuration of Question Generation Apparatus 1)

Figure 1:
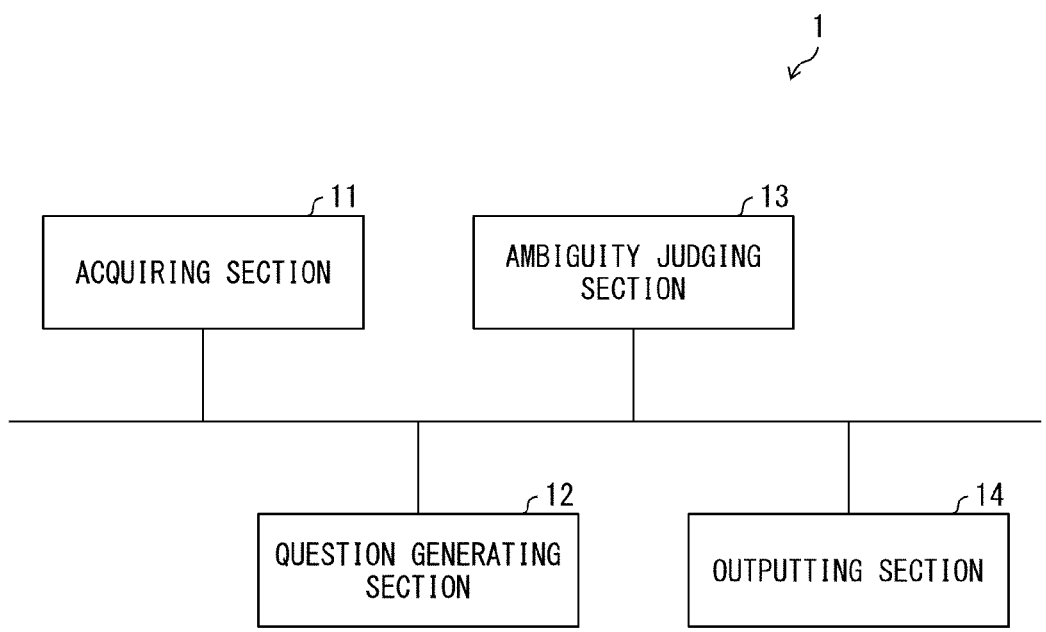
FIG. 1 is a block diagram illustrating a configuration of a question generation apparatus in accordance with a first example embodiment of the present invention.

A configuration of a question generation apparatus 1 in accordance with the present example embodiment will be described below, with reference to FIG. 1. FIG. 1 is a block diagram illustrating a configuration of the question generation apparatus 1 in accordance with the present example embodiment.

The question generation apparatus 1 in accordance with the present example embodiment generates a single question to which all of a plurality of character strings each of which can be an answer to a question are answers. In the following description, the "character string which can be an answer to a question" refers to a character string which contains one or more words and which makes sense. Further, a "piece of text" refers to the one that consists of one or more sentences and that is coherent.

In a case where there are a plurality of answers to a question generated, the question generation apparatus 1 outputs the question. In the following description, there being a plurality of answers to a question is also expressed as a question having ambiguity.

The question generation apparatus 1 includes an acquiring section 11, a question generating section 12, an ambiguity judging section 13, and an outputting section 14, as illustrated in FIG. 1. In the present example embodiment, the acquiring section 11, the question generating section 12, the ambiguity judging section 13, and the outputting section 14 are components for implementing the acquiring means, the question generating means, the ambiguity judging means, and the outputting means, respectively.

The acquiring section 11 acquires a plurality of character strings each of which can be an answer to a question and pieces of text respectively associated with the plurality of character strings.

Examples of the "piece of text associated with a character string" include: a piece of text containing the character string; and a piece of text containing a representation which means the same as the character string but differs in notation from the character string (e.g., in a case where the character string is represented in kanji, a piece of text represented in hiragana, a piece of text represented in alphabet, and a piece of text represented in an abbreviated manner which are used in the same meaning as the character string is). The "representation which means the same as the character string but differs in notation from the character string" may be a character string similar in embedded expression to the character string. The "piece of text associated with a character string" may be a piece of text similar in embedded expression to a piece of text containing the character string. The acquiring section 11 supplies the question generating section 12 with the pieces of text acquired.

In this respect, the "embedded expression" is the expression of elements which form natural language of a character string, a word, text, a document, or the like in the form of real-valued vectors in space.

The question generating section 12 generates, with reference to the pieces of text acquired by the acquiring section 11, for each of the plurality of character strings, a question an answer to which is that character string. The question generating section 12 supplies the ambiguity judging section 13 with a plurality of questions generated.

The ambiguity judging section 13 judges, for each of the plurality of questions generated by the question generating section 12, whether there are a plurality of answers to that question. In other words, the ambiguity judging section 13 judges whether each of the plurality of questions generated by the question generating section 12 has ambiguity. The ambiguity judging section 13 supplies the outputting section 14 with the judgment result.

The outputting section 14 outputs a question which is included in the plurality of questions generated by the question generating section 12 and which has been judged, by the ambiguity judging section 13, to be the question to which there are a plurality of answers.

As above, a configuration employed in the question generation apparatus 1 in accordance with the present example embodiment is such that an acquiring section 11, a question generating section 12, an ambiguity judging section 13, and an outputting section 14 are included, the acquiring section 11 being for acquiring a plurality of character strings each of which can be an answer to a question and pieces of text respectively associated with the plurality of character strings, the question generating section 12 being for generating, with reference to the pieces of text acquired by the acquiring section 11, for each of the plurality of character strings, a question an answer to which is that character string, the ambiguity judging section 13 being for judging, for each of a plurality of questions generated by the question generating section 12, whether there are a plurality of answers to that question, the outputting section 14 being for outputting a question which is included in the plurality of questions generated by the question generating section 12 and which has been judged, by the ambiguity judging section 13, to be the question to which there are a plurality of answers.

Thus, in the present example embodiment, a plurality of questions are generated each of which is a single question an answer to which is each of the plurality of character strings, and a question is outputted which is included in the plurality of questions generated and to which there are a plurality of answers. This provides the example advantage of being capable of more accurately generating a question to which there are a plurality of answers than in a case where a plurality of answers are inputted to a model having been trained so as to generate a question which corresponds to a single answer.

In addition, in the present example embodiment, each of the plurality of character strings is associated with a piece of text, and the plurality of character strings are not necessarily contained in a single piece of text. For example, among the plurality of character strings, the piece of text associated with one character string and the piece of text associated with another character string may differ from each other. In contrast, the information processing apparatus disclosed in Patent Literature 1 only generates a question an answer to which is a character string contained in a single piece of text. Therefore, the present example embodiment provides an example advantage of being capable of accurately generating a more equivocal question to which there are a plurality of answers.

(Flow of Question Generation Method S1)

Figure 2:
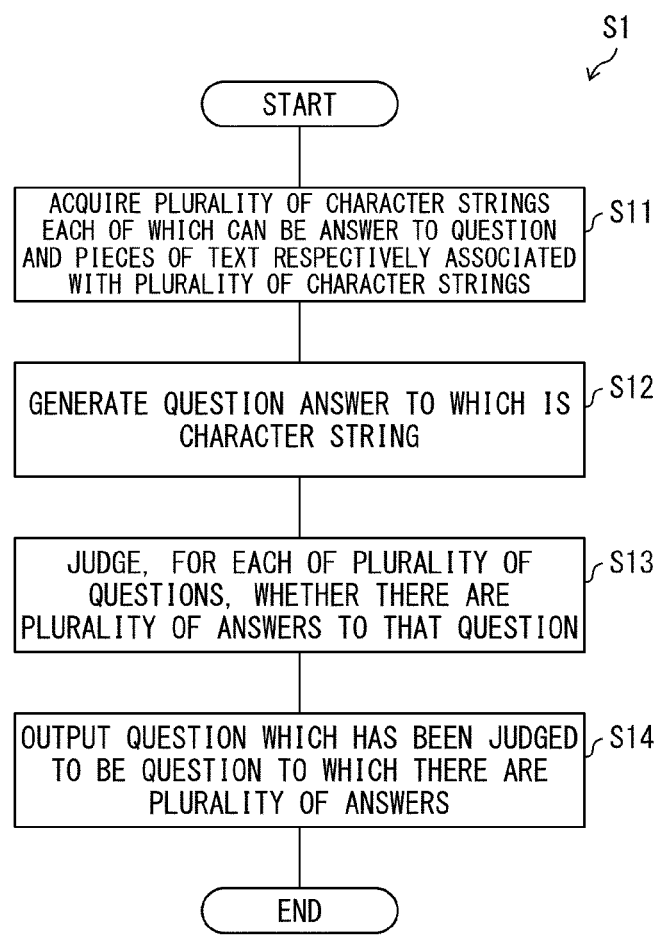
FIG. 2 is a flowchart illustrating a flow of a question generation method in accordance with the first example embodiment of the present invention.

A flow of a question generation method S1 in accordance with the present example embodiment will be described with reference to FIG. 2. FIG. 2 is a flowchart illustrating a flow of the question generation method S1 in accordance with the present example embodiment.

(Step S11)

In step S11, the acquiring section 11 acquires a plurality of character strings each of which can be an answer to a question and pieces of text respectively associated with the plurality of character strings. The acquiring section 11 supplies the question generating section 12 with the pieces of text acquired.

(Step S12)

In step S12, the question generating section 12 generates, with reference to the pieces of text acquired by the acquiring section 11, for each of the plurality of character strings, a question an answer to which is that character string. The question generating section 12 supplies the ambiguity judging section 13 with a plurality of questions generated.

(Step S13)

In step S13, the ambiguity judging section 13 judges, for each of the plurality of questions generated by the question generating section 12, whether there are a plurality of answers to that question. The ambiguity judging section 13 supplies the outputting section 14 with the judgment result.

(Step S14)

In step S14, the outputting section 14 outputs a question which is included in the plurality of questions generated by the question generating section 12 and which has been judged, by the ambiguity judging section 13, to be the question to which there are a plurality of answers.

As above, a configuration employed in the question generation method S1 in accordance with the present example embodiment is such that steps S11, S12, S13, and S14 are included, step S11 being the acquiring section 11 acquiring a plurality of character strings each of which can be an answer to a question and pieces of text respectively associated with the plurality of character strings, step S12 being the question generating section 12 generating, with reference to the pieces of text acquired by the acquiring section 11, for each of the plurality of character strings, a question an answer to which is that character string, step S13 being the ambiguity judging section 13 judging, for each of a plurality of questions generated by the question generating section 12, whether there are a plurality of answers to that question, step S14 being the outputting section 14 outputting a question which is included in the plurality of questions generated by the question generating section 12 and which has been judged, by the ambiguity judging section 13, to be the question to which there are a plurality of answers. Therefore, the question generation method S1 in accordance with the present example embodiment provides the same example advantage that is provided by the question generation apparatus 1 described above.

Second Example Embodiment

The following description will discuss a second example embodiment of the present invention in detail, with reference to the drawings. A component that has the same function as a component described in the first example embodiment is assigned the same reference sign, and the description thereof is omitted, where appropriate.

(Configuration of Question Generation Apparatus 2)

Figure 3:
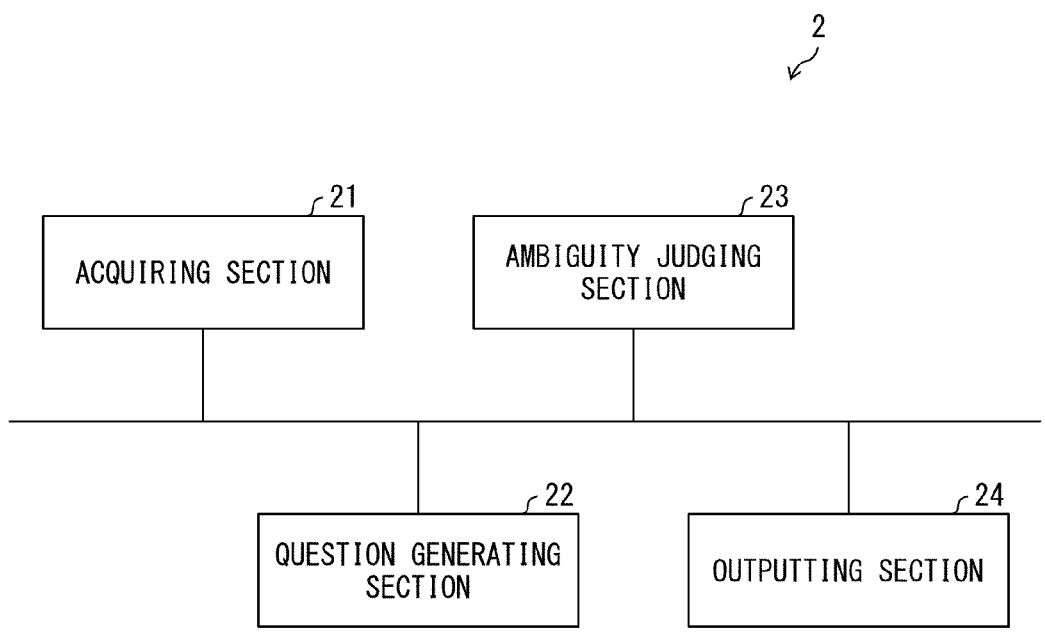
FIG. 3 is a block diagram illustrating a configuration of a question generation apparatus in accordance with a second example embodiment of the present invention.

A configuration of a question generation apparatus 2 in accordance with the present example embodiment will be described with reference to FIG. 3. FIG. 3 is a block diagram illustrating a configuration of the question generation apparatus 2 in accordance with the present example embodiment.

The question generation apparatus 2 in accordance with the present example embodiment generates a single question to which all of a plurality of character strings each of which can be an answer to a question are answers. The question generation apparatus 2 generates a question an answer to which is each of a plurality of character strings which are extracted from at least one piece of text and each of which can be an answer to a question. Further, the question generation apparatus 2 judges, for each of a plurality of questions generated, whether there are a plurality of answers to that question, in accordance with a similarity which indicates a degree to which that question and another question are similar to each other, and outputs a question having been judged to be the question to which there are a plurality of answers.

The question generation apparatus 2 includes an acquiring section 21, a question generating section 22, an ambiguity judging section 23, and an outputting section 24, as illustrated in FIG. 3. In the present example embodiment, the acquiring section 21, the question generating section 22, the ambiguity judging section 23, and the outputting section 24 are components for implementing the acquiring means, the question generating means, the ambiguity judging means, and the outputting means, respectively.

The acquiring section 21 acquires at least one piece of text. The acquiring section 21 supplies the question generating section 22 with the at least one piece of text acquired.

The question generating section 22 generates a question an answer to which is each of a plurality of character strings which are extracted from the at least one piece of text acquired by the acquiring section 21 and each of which can be an answer to a question. The question generating section 22 supplies the ambiguity judging section 23 with a plurality of questions generated.

The ambiguity judging section 23 judges, for each of the plurality of questions generated by the question generating section 22, whether there are a plurality of answers to that question, in accordance with a similarity which indicates a degree to which that question and another question are similar to each other. The ambiguity judging section 23 supplies the outputting section 24 with the judgment result.

The outputting section 24 outputs a question which is included in the plurality of questions generated by the question generating section 22 and which has been judged, by the ambiguity judging section 23, to be the question to which there are a plurality of answers. In other words, the outputting section 24 has the same function as the outputting section 14 described above.

As above, a configuration employed in the question generation apparatus 2 in accordance with the present example embodiment is such that an acquiring section 21, a question generating section 22, an ambiguity judging section 23, and an outputting section 24 are included, the acquiring section 21 being for acquiring at least one piece of text, the question generating section 22 being for generating a question an answer to which is each of a plurality of character strings which are extracted from the at least one piece of text acquired by the acquiring section 21 and each of which can be an answer to a question, the ambiguity judging section 23 being for judging, for each of a plurality of questions generated by the question generating section 22, whether there are a plurality of answers to that question, in accordance with a similarity which indicates a degree to which that question and another question are similar to each other, the outputting section 24 being for outputting a question which is included in the plurality of questions generated by the question generating section 22 and which has been judged, by the ambiguity judging section 23, to be the question to which there are a plurality of answers. It should be noted that "being similar" includes a case of "being identical". For example, that question and another question being identical to each other is expressed as having the highest similarity.

Thus, in the present example embodiment, a plurality of questions are generated each of which is a single question an answer to which is each of the plurality of character strings, and a question is outputted which is included in the plurality of questions generated and to which there are a plurality of answers. This provides the example advantage of being capable of more accurately generating a question to which there are a plurality of answers than in a case where a plurality of answers are inputted to a model having been trained so as to generate a question which corresponds to a single answer.

The question generation apparatus 2 in accordance with the present example embodiment judges whether there are a plurality of answers, in accordance with a similarity which indicates a degree to which one question and another question are similar to each other. Assume, for example, that the question generation apparatus 2 in accordance with the present example embodiment generates a question Q_1 an answer to which is an answer A_1, and generates a question Q_2 (which is not the same as the question Q_1) an answer to which is an answer A_2 (which is not the same as the answer A_1). In this case, when the similarity between the question Q_1 and the question Q_2 is high, the answer A_2, which is the answer to the question Q_2, is highly likely to be an answer to the question Q_1 as well. In this case, the question generation apparatus 2 in accordance with the present example embodiment outputs the question Q_1. Therefore, the question generation apparatus 2 in accordance with the present example embodiment provides an example advantage of being capable of accurately generating a question having a plurality of answers.

(Flow of Question Generation Method S2)

Figure 4:
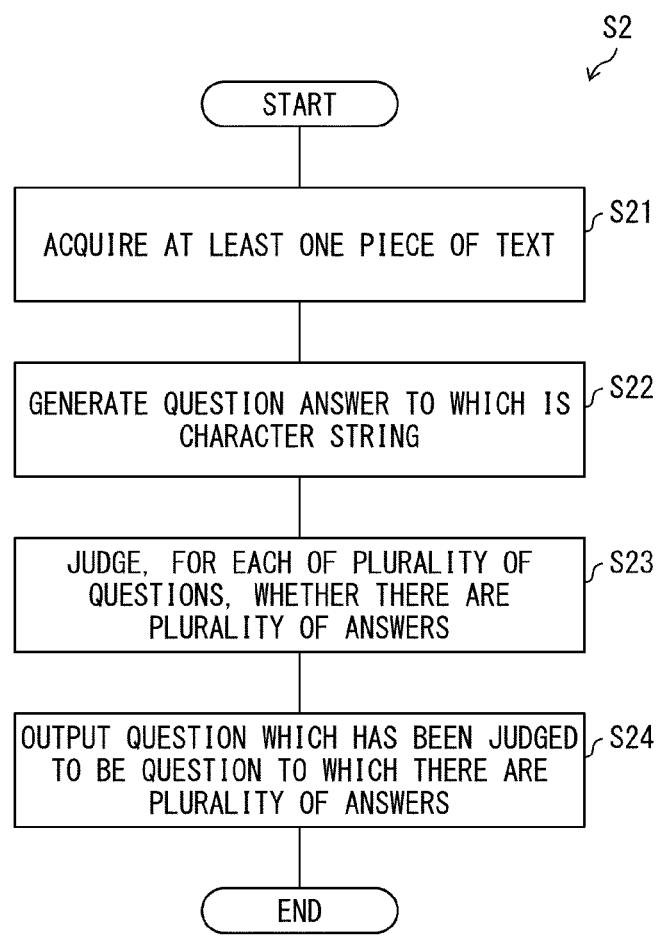
FIG. 4 is a flowchart illustrating a flow of a question generation method in accordance with the second example embodiment of the present invention.

A flow of a question generation method S2 in accordance with the present example embodiment will be described with reference to FIG. 4. FIG. 4 is a flowchart illustrating a flow of the question generation method S2 in accordance with the present example embodiment.

(Step S21)

In step S21, the acquiring section 21 acquires at least one piece of text. The acquiring section 21 supplies the question generating section 22 with the at least one piece of text acquired.

(Step S22)

In step S22, the question generating section 22 generates a question an answer to which is each of a plurality of character strings which are extracted from the at least one piece of text acquired by the acquiring section 21 and each of which can be an answer to a question. The question generating section 22 supplies the ambiguity judging section 23 with a plurality of questions generated.

(Step S23)

In step S23, the ambiguity judging section 23 judges, for each of the plurality of questions generated by the question generating section 22, whether there are a plurality of answers to that question, in accordance with a similarity which indicates a degree to which that question and another question are similar to each other. The ambiguity judging section 23 supplies the outputting section 24 with the judgment result.

(Step S24)

In step 24, the outputting section 24 outputs a question which is included in the plurality of questions generated by the question generating section 22 and which has been judged, by the ambiguity judging section 23, to be the question to which there are a plurality of answers.

As above, a configuration employed in the question generation method S2 in accordance with the present example embodiment is such that steps S21, S22, S23, and S24 are included, step S21 being the acquiring section 21 acquiring at least one piece of text, step S22 being the question generating section 22 generating a question an answer to which is each of a plurality of character strings which are extracted from the at least one piece of text acquired by the acquiring section 21 and each of which can be an answer to a question, step S23 being the ambiguity judging section 23 judging, for each of a plurality of questions generated by the question generating section 22, whether there are a plurality of answers to that question, in accordance with a similarity which indicates a degree to which that question and another question are similar to each other, step S24 being the outputting section 24 outputting a question which is included in the plurality of questions generated by the question generating section 22 and which has been judged, by the ambiguity judging section 23, to be the question to which there are a plurality of answers. Therefore, the question generation method S2 in accordance with the present example embodiment provides the same example advantage that is provided by the question generation apparatus 2 described above.

Third Example Embodiment

The following description will discuss a third example embodiment of the present invention in detail, with reference to the drawings. A component that has the same function as a component described in the example embodiments described above is assigned the same reference sign, and the description thereof is omitted, where appropriate.

(Outline of Question Generation Apparatus 3)

A question generation apparatus 3 in accordance with the present example embodiment generates a single question to which all of a plurality of character strings each of which can be an answer to a question are answers. The question generation apparatus 3 has the same function as the question generation apparatus 1 and the question generation apparatus 2 described above.

Further, the question generation apparatus 3 outputs a question generated, in a case where there are a plurality of answers to the question generated. Thus, the question generation apparatus 3 outputs a question which has ambiguity.

(Configuration of Question Generation Apparatus 3)

Figure 5:
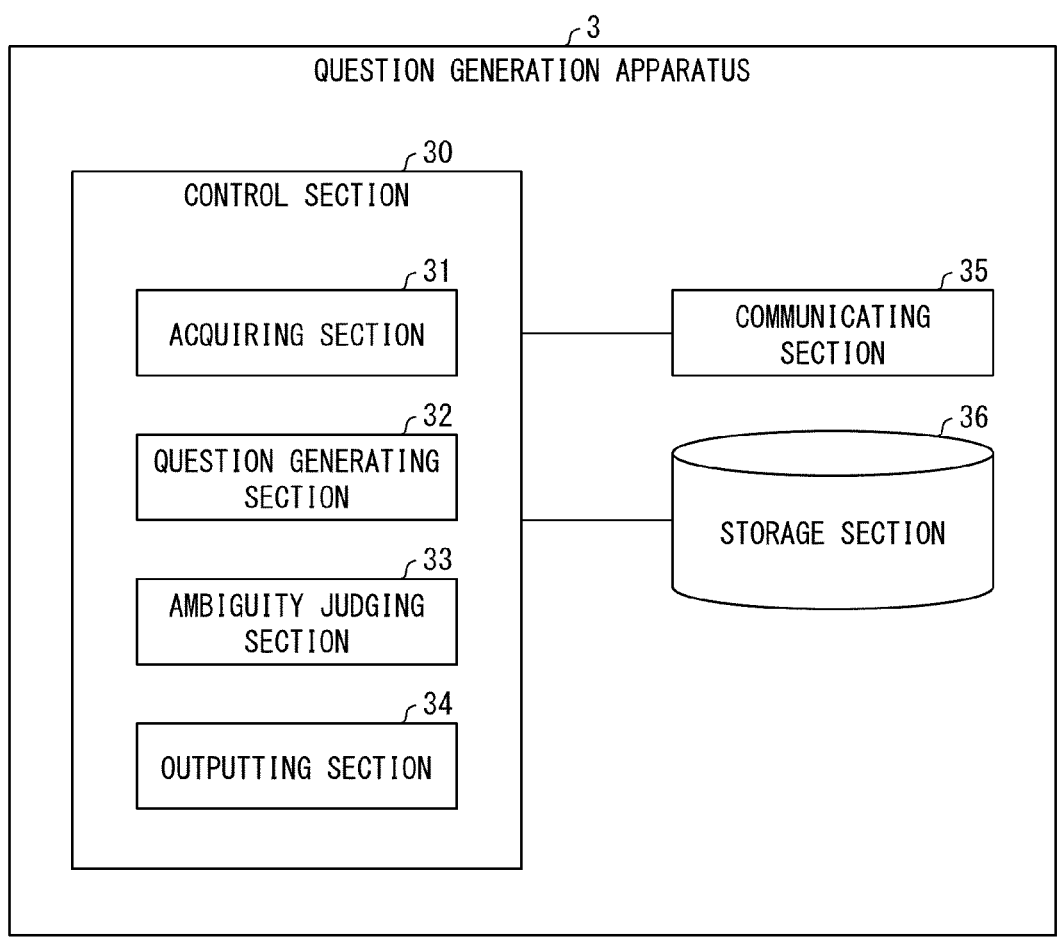
FIG. 5 is a block diagram illustrating a configuration of a question generation apparatus in accordance with a third example embodiment of the present invention.

A configuration of a question generation apparatus 3 in accordance with the present example embodiment will be described with reference to FIG. 5. FIG. 5 is a block diagram illustrating a configuration of the question generation apparatus 3 in accordance with the present example embodiment.

The question generation apparatus 3 includes a control section 30, a communicating section 35, and a storage section 36, as illustrated in FIG. 5.

The communicating section 35 is an interface via which data is transmitted and received. Examples of data received by the communicating section 35 include a plurality of character strings each of which can be an answer to a question and pieces of text respectively associated with the plurality of character strings. Other Examples of the data received by the communicating section 35 include a plurality of character strings each of which can be an answer to a question. Examples of data transmitted by the communicating section 35 include a question having been judged to be the question to which there are a plurality of answers.

Alternatively, the question generation apparatus 3 may have a configuration so as to include a data inputting section and a data outputting section, instead of or in addition to the communicating section 35, the data inputting section being an interface via which the input of data is accepted, the data outputting section being an interface via which data is outputted.

In the storage section 36, data referred to by the control section 30 is stored. Examples of the data stored in the storage section 36 include: a plurality of character strings each of which can be an answer to a question and pieces of text respectively associated with the plurality of character strings; a plurality of character strings each of which can be an answer to a question; a plurality of questions generated; a judgment result (described later); a question having been judged to be the question to which there are a plurality of answers; and intermediate information (described later).

(Control Section 30)

The control section 30 controls each of the components included by the question generation apparatus 3. The control section 30 includes an acquiring section 31, a question generating section 32, an ambiguity judging section 33, and an outputting section 34, as illustrated in FIG. 5. In the present example embodiment, the acquiring section 31, the question generating section 32, the ambiguity judging section 33, and the outputting section 34 are components for implementing the acquiring means, the question generating means, the ambiguity judging means, and the outputting means, respectively.

The acquiring section 31 acquires data via the communicating section 35. As an example, the acquiring section 31 acquires a plurality of character strings each of which can be an answer to a question and pieces of text respectively associated with the plurality of character strings. As another example, the acquiring section 31 acquires at least one piece of text. Therefore, the acquiring section 31 has the function(s) of the acquiring section 11, the acquiring section 21, or both of the acquiring sections 21 and 21 described above.

The acquiring section 31 may acquire a plurality of character strings each of which can be an answer to a question and pieces of text respectively associated with the plurality of character strings at the same time, or may acquire the plurality of character strings and the pieces of text separately. When the plurality of character strings and the pieces of text are acquired separately, the acquiring section 31 may acquire the plurality of character strings each of which can be an answer to a question, and may acquire the pieces of text in accordance with the character strings having been acquired. Alternatively, the acquiring section 31 may acquire the plurality of character strings each of which can be an answer to a question, in accordance with the pieces of text having been acquired. Alternatively, the acquiring section 31 may repeatedly carry out a process of acquiring the pieces of text in accordance with the character strings having been acquired and a process of acquiring, in accordance with the pieces of text having been acquired, a plurality of character strings each of which can be an answer to a question.

As an example, each of the plurality of character strings acquired by the acquiring section 31 may be extracted from a piece of text associated with that character string. In other words, a piece of text is associated with each of the plurality of character strings, the piece of text being the source of the extraction of that character string. As an example, one character string which can be an answer to a question may be extracted from a single piece of text. As another example, one character string which can be an answer to a question may be shared in common by and extracted from a plurality of pieces of text. As still another example, one character string and another character string each of which can be an answer to a question may be extracted from the same piece of text, or may be extracted from respective pieces of text different from each other. Further, the process of extracting a character string from a piece of text may be carried out by the acquiring section 31.

The acquiring section 31 may have a configuration so as to acquire data inputted by a user. As an example, the acquiring section 31 may acquire, through input performed by a user, a plurality of character strings, pieces of text respectively associated with the plurality of character strings, or both the plurality of character strings and the pieces of text.

Further, the acquiring section 31 may acquire data stored in any server on a network which is accessible to the acquiring section 31. As an example, the acquiring section 31 may acquire pieces of text stored in a text database.

The acquiring section 31 stores the pieces of text or the plurality of character strings in the storage section 36. An example process carried out by the acquiring section 31 will be described later.

The question generating section 32 generates a question an answer to which is a character string. As an example, the question generating section 32 generates, with reference to the pieces of text acquired by the acquiring section 31, for each of the plurality of character strings, a question an answer to which is that character string. For example, in a case where the acquiring section 31 acquires, from the pieces of text stored in the text database, pieces of text respectively containing the plurality of character strings, the question generating section 32 refers to the pieces of text respectively containing the plurality of character strings included in the pieces of text stored in the text database, with the pieces of text respectively containing the plurality of character strings being treated as the pieces of text respectively associated with the plurality of character strings.

As another example, the question generating section 32 generates a question an answer to which is each of the plurality of character strings, each of which is extracted from at least one piece of text acquired by the acquiring section 31 and each of which can be an answer to a question. Therefore, the question generating section 32 has the function(s) of the question generating section 12, the question generating section 22, or both of the question generating sections 12 and 22 described above. The question generating section 32 stores, in the storage section 36, the questions generated. An example process carried out by the question generating section 32 will be described later.

The ambiguity judging section 33 judges whether there are a plurality of answers to a question. As an example, the ambiguity judging section 33 judges, for each of the plurality of questions generated by the question generating section 32, whether there are a plurality of answers to that question. For example, the ambiguity judging section 33 selects one question from among the plurality of questions, and judges whether there are a plurality of answers to the one question. Subsequently, the ambiguity judging section 33 selects, from among the plurality of questions, another question which is other than the question having been selected, and judges whether there are a plurality of answers to the other question. The ambiguity judging section 33 repeats this process to judge, for each of the plurality of questions, whether there are a plurality of answers.

As another example, the ambiguity judging section 33 judges, for each of the plurality of questions generated by the question generating section 32, whether there are a plurality of answers, in accordance with a similarity which indicates a degree to which that question and another question are similar to each other.

For example, the ambiguity judging section 33 selects a question Q1 to be subjected to judgment and a question Q2 to be subjected to comparison, from among N questions (question Q1 to question QN). Next, the ambiguity judging section 33 judges, in accordance with the similarity between the question Q1 and the question Q2, whether there are a plurality of answers to the question Q1. Subsequently, the ambiguity judging section 33 selects a question Q3 as a question to be subjected to comparison, and judges, in accordance with the similarity between the question Q1 to be subjected to judgment and the question Q3 to be subjected to comparison, whether there are a plurality of answers to the question Q. The ambiguity judging section 33 repeats the same process until the question QN has been selected as the question to be subjected to comparison.

The ambiguity judging section 33 then selects the question QN as the question to be subjected to comparison, and judges, in accordance with the similarity between the question Q1 and the question QN, whether there are a plurality of answers to the question Q1. After that, the ambiguity judging section 33 selects the question Q2 to be subjected to judgment. Further, the ambiguity judging section 33 selects the question Q3 to be subjected to comparison. The ambiguity judging section 33 then judges, in accordance with the similarity between the question Q2 and the question Q3, whether there are a plurality of answers to the question Q2. The subsequent processes are the same as the processes described above. In this respect, in selecting a question to be subjected to judgment, the ambiguity judging section 33 may omit a process of selecting the question already having been subjected to comparison of similarity, as a question to be subjected to comparison. For example, in selecting the question Q2 as a question to be subjected to judgment, the ambiguity judging section 33 may omit a process of selecting the question Q1 already having been subjected to comparison of similarity, as a question to be subjected to comparison.

Therefore, the ambiguity judging section 33 has the function(s) of the ambiguity judging section 13, the ambiguity judging section 23, or both of the ambiguity judging sections 13 and 23 described above. The ambiguity judging section 33 stores the judgment result in the storage section 36. An example process carried out by the ambiguity judging section 33 will be described later.

The outputting section 34 outputs data via the communicating section 35. As an example, the outputting section 34 refers to the judgment results and the plurality of questions generated that are stored in the storage section 36. The outputting section 34 then outputs a question which is included in the plurality of questions generated and which has been judged, by the ambiguity judging section 33, to be the question to which there are a plurality of answers. Therefore, the outputting section 34 has the same function as the outputting section 14 and the outputting section 24 described above. Further, the outputting section 34 may have a configuration so as to output a question having been judged to be the question to which there are a plurality of answers, together with an answer to the question.

(Example Process 1 Carried Out by Acquiring Section 31)

A configuration of the acquisition of pieces of text performed by the acquiring section 31 may be such that pieces of text stored in any server on a network accessible to the acquiring section 31 are acquired, as described above. As an example, the acquiring section 31 may acquire a piece of text which is included in the pieces of text stored in any server on a network accessible to the acquiring section 31 and which contains a character string which can be an answer to a question. Further, the acquiring section 31 may acquire a piece of text in which a character string which can be an answer to a question is the subject of a sentence.

As another example, the acquiring section 31 may acquire not only a piece of text containing a character string which can be an answer to a question but also a piece of text containing another character string which can be an answer to the question. For example, in a case where the character string which can be an answer to a question is "Japan", a possible question can be "what country is in Asia?". Examples of an answer to the question "what country is in Asia?" include "China". In this case, the acquiring section 31 may acquire a piece of text containing the word "China".

A configuration employed as still another example is such that the acquiring section 31 acquires, as the piece of text, an article which falls into the same category that the character string which can be an answer to a question falls into, from any server on a network accessible to the acquiring section 31. For example, in a case where the character string which can be an answer to the question is "Japan", the acquiring section 31 may acquire, as the piece of text, an article (e.g., an article concerning China) which falls into the same category "Asian country" that "Japan" falls into.

As still another example, in a case where a piece of text containing a character string which can be an answer to a question has a setting which is configured for the character string and with which another text is accessed, the acquiring section 31 may acquire the other text. For example, a web page has a setting which is configured for the character string "Japan" that can be an answer to a question and with which a web page of "Japan" of an encyclopedia is accessed, the acquiring section 31 may acquire a piece of text in the web page of "Japan" of the encyclopedia, to which access is made.

(Example Process 2 Carried Out by Acquiring Section 31)

In a case where there are a plurality of character strings each of which can be an answer to a question, the acquiring section 31 may acquire a piece of text falling into a common category shared by the plurality of character strings. For example, in a case where there are "Japan" and "China" which are the character strings each of which can be an answer to a question, the acquiring section 31 may acquire a piece of text concerning a "country", which are the common category shared by the words "Japan" and "China".

Examples of a method of the acquiring section 31 acquiring a piece of text falling into the common category shared by the plurality of character strings include a method in which a similarity between the vectors of the plurality of character strings is used, the similarity being obtained with a context taken into consideration. Here is the description of a specific example.

Assuming a set of a plurality of character strings is {A_1, A_2, ... A_n}, the acquiring section 31 selects a set of pieces of text each of which contains a corresponding A_i (i=1, 2, ..., n). The piece of text containing A_i is defined as d_ij {j=1, 2, ..., M(i)}. M(i) is the number of pieces of text which contain A_i.

Subsequently, the acquiring section 31 inputs each d_ij into a known algorithm (e.g., BERT: bidirectional encoder representations from transformers) for converting textual information into a feature vector. The acquiring section 31 then calculates v_ij obtained by averaging vectors each of which is a part of the vector outputted from the algorithm, the part corresponding to the character string of A_i. The v_ij calculated can be regarded as a vector representing the role of the character string A_i in the piece of text d_ij.

Next, the acquiring section 31 calculates a similarity between the vectors. As an example, the acquiring section 31 uses a similarity function, sim, which is for calculating a cosine similarity, to calculate the similarity between the vectors.

For example, the acquiring section 31 uses the Formula (1) below, to calculate, for each character string A_i, a corresponding mean vector V_i which is a mean vector for each element of the vector v_ij.

$$V\_i=(v\_i1+v\_i2+ \ldots +v\_iM(i))/M(i) \quad (1)$$

The mean vector V_i can be regarded as a vector representing the average role of A_i in the piece of text containing A_i.

Subsequently, the acquiring section 31 uses Formula (2) below, to calculate a mean vector V, which is the average of the mean vectors V_i of all the character strings.

$$V=(V\_1+V\_2+ \ldots +V\_n)/n \quad (2)$$

The vector V is the average of the vectors representing the respective roles of A_1, A_2, ..., A_n, and is thus regarded as a vector representing a "common role" shared by A_i, ..., A_n.

The acquiring section 31 then calculates, for each A_i, the similarity sim(v_ij,V) between the vector v_ij and the vector V, and acquires the piece of text d_ij that has the calculated similarity equal to or higher than a threshold value.

(Example Process 3 Carried Out by Acquiring Section 31)

Figure 6:
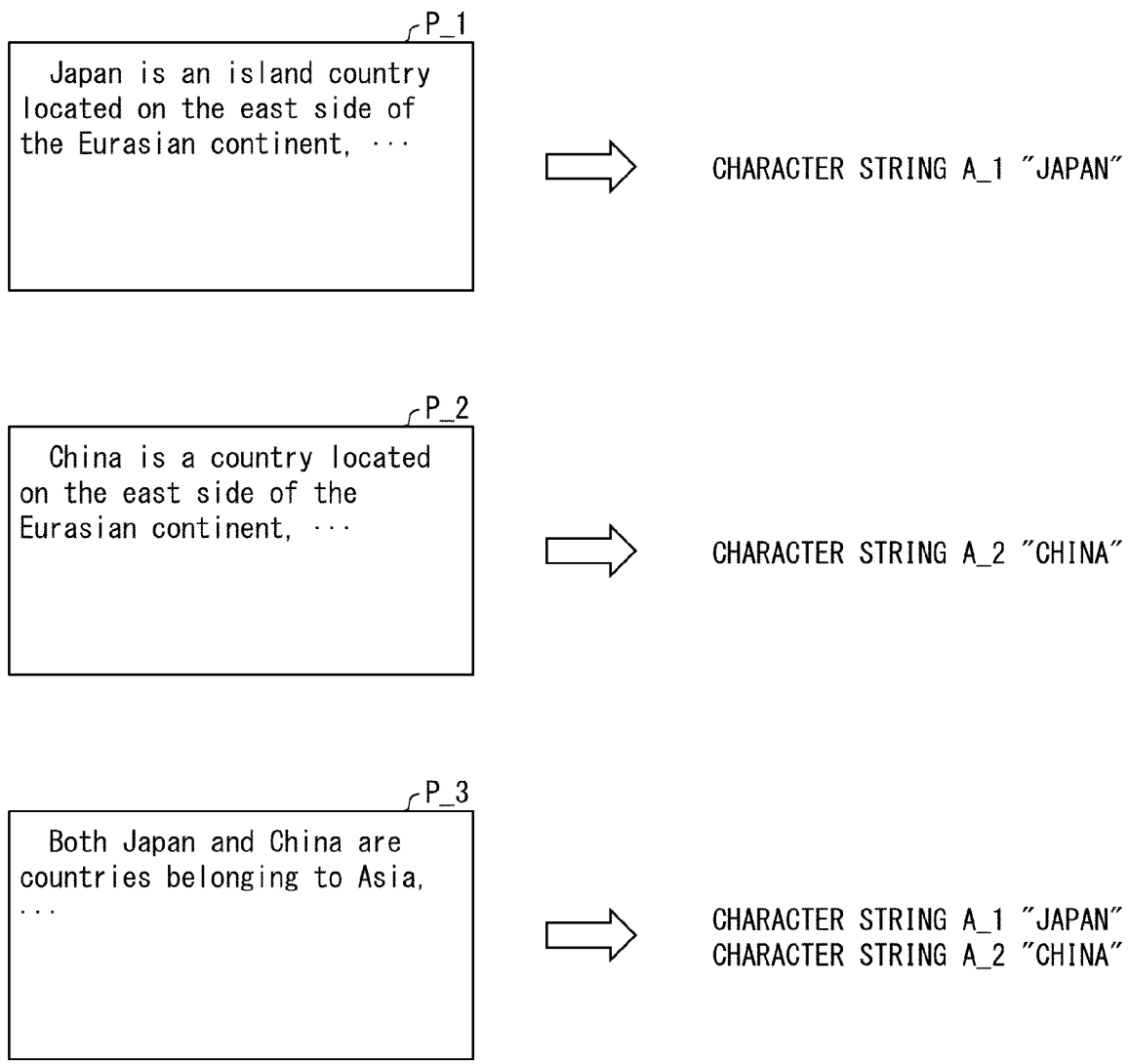
FIG. 6 is a diagram illustrating an example process carried out by an acquiring section in accordance with the third example embodiment of the present invention.

A process of the acquiring section 31 extracting, from at least one piece of text acquired, a character string which can be an answer to a question will be described with reference to FIG. 6. FIG. 6 is a diagram illustrating an example process carried out by the acquiring section 31 in accordance with the present example embodiment.

As an example, the acquiring section 31 uses a known technique to analyze the grammar and syntax of a piece of text, to extract, as the character strings, a proper noun, a noun clause, a subject, an object, and the like which are contained in the piece of text. For example, in a case where a piece of text P_1 illustrated on the upper side of FIG. 6 is acquired, the acquiring section 31 analyzes the grammar and syntax of the piece of text P_1, and extracts the character string A_1 "Japan" from the piece of text P_1. Further, in a case where a piece of text P_2 illustrated in the middle part of FIG. 6 is acquired, the acquiring section 31 analyzes the grammar and syntax of the piece of text P_2 and extracts the character string A_2 "China" from the piece of text P_2.

Alternatively, the acquiring section 31 may extract a plurality of character strings from a single piece of text. For example, in a case where a piece of text P_3 illustrated on the lower side of FIG. 6 is acquired, the acquiring section 31 analyzes the grammar and syntax of the piece of text P_3, and extracts the character string A1 "Japan" and the character string A_2 "China" from the piece of text P_3.

As another example, the acquiring section 31 has a configuration so as to use a language generation model, the language generation model having been trained so as to receive a piece of text as an input and output a character string which is included in the piece of text and which can be an answer to a question. The language generation model is trained with use of labeled training data consisting of a plurality of pairs each being a pair of a piece of text and a character string which can be an answer to a question. Examples of the language generation model include a text-to-text transfer transformer (T5), a bidirectional auto-regressive transformer (BART), and a generative pre-trained transformer (GPT).

As still another example, the acquiring section 31 may acquire an existing list of things and persons that have the same properties as does a character string which can be an answer to a question. Examples of the list include a list which is stored in a server in a knowledge base and which is of entities falling into the same class as does the character string which can be an answer to a question.

As still another example, the acquiring section 31 may extract, from a piece of text, a character string having the same kind of entity as does the character string having been extracted. Examples of this configuration include a configuration in which the acquiring section 31 uses a known entity set expansion technique to extract, from a piece of text, a character string having the same kind of entity as does the character string having been extracted.

(Example Process 1 Carried Out by Question Generating Section 32)

The question generating section 32 may have a configuration so as to use a question generation model, the question generation model having been trained so as to receive a single character string and a single piece of text as inputs and output a single question an answer to which is the single character string. In this case, the question generating section 32 generates a question by inputting, to the question generation model, at least one character string of the plurality of character strings and a piece of text associated with the at least one character string.

Figure 7:
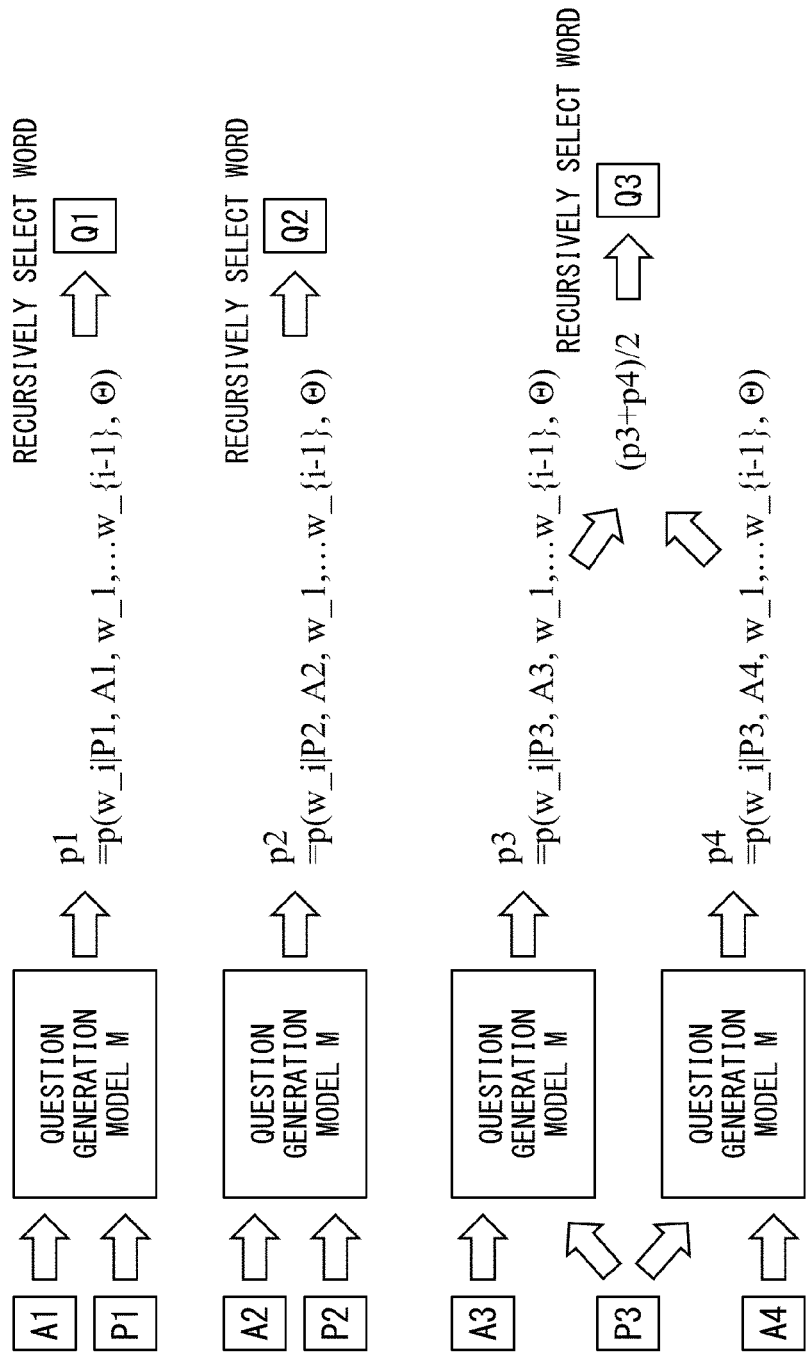
FIG. 7 is a diagram illustrating another example process carried out by a question generating section in accordance with the third example embodiment of the present invention.

Alternatively, the question generating section 32 may have a configuration so as to use intermediate information which is generated by a question generation model and which indicates a predictive probability of an ordering of tokens which form a question to be outputted, the question generation model having been trained so as to receive a single character string and a single piece of text as inputs and output a single question an answer to which is the single character string. This configuration will be described with use of FIG. 7. FIG. 7 is a diagram illustrating another example process carried out by the question generating section 32 in accordance with the present example embodiment.

The question generating section 32 inputs, to a question generation model M, a character string A1 and a piece of text P1 associated with the character string A1, as illustrated on the upper side of FIG. 7. Outputted from the question generation model M is intermediate information calculated with use of Formula (3) below, the intermediate information being a probability distribution p1 which predicts the next token, given that the tokens (words) of a question sentence are w_1, w_2, ..., w_n.

$$p1=p(w\_i|P1,A1,w\_1,w\_2, \ldots ,w\_\{i-1\},\Theta) \quad (3)$$

In formula (3), Θ is a parameter of the question generation model.

The question generating section 32 recursively repeats a process of selecting, with reference to the probability distribution p1 outputted from the question generation model M, a token which has a high probability of occurrence as the next token, to generate the question Q1.

Similarly, the question generating section 32 inputs a character string A2 and a piece of text P2 to the question generation model M, as illustrated in the second instance from the top of FIG. 7. Outputted from the question generation model M is a probability distribution p2 which is calculated with use of Formula (4) below and which predicts the next token.

$$p2=p(w\_i|P2,A2,w\_1,w\_2,\ldots,w\_\{i-1\},\Theta) \quad (4)$$

The question generating section 32 recursively repeats the process of selecting, with reference to the probability distribution p2 outputted from the question generation model M, a token which has a high probability of occurrence as the next token, to generate the question Q2.

As above, the question generating section 32 generates a question with use of a question generation model, the question generation model having been trained so as to receive a single character string and a single piece of text as inputs to output a single question an answer to which is the single character string. Thus, with a question generating section 32, it is possible to accurately generate a question an answer to which is a character string.

(Example Process 2 Carried Out by Question Generating Section 32)

The question generating section 32 may generate a question with reference to a first intermediate information and a second intermediate information generated by a trained question generation model. The first intermediate information is generated by inputting, to a question generation model, a first character string of a plurality of character strings and a piece of text associated with the first character string. The second intermediate information is generated by inputting, to the question generation model, a second character string of the plurality of character strings and a piece of text associated with the second character string, the second character string being different from the first character string.

For example, the question generating section 32 inputs a character string A3 and a piece of text P3 to the question generation model M, as illustrated on the lower side of FIG. 7. The question generation model M uses Formula (5) below to calculate a probability distribution p3, which is the first intermediate information, and outputs the probability distribution p3. Similarly, the question generating section 32 inputs a character string A4 and the piece of text P3 to the question generation model M. The question generation model M uses Formula (6) below to calculate a probability distribution p4, which is the second intermediate information, and outputs the probability distribution p4.

$$p3=p(w\_i|P3,A3,w\_1,w\_2,\ldots,w\_\{i-1\},\Theta) \quad (5)$$

$$p4=p(w\_i|P3,A4,w\_1,w\_2,\ldots,w\_\{i-1\},\Theta) \quad (6)$$

The question generating section 32 recursively repeats the process of selecting, with reference to a probability distribution (p3+p4)/2, which is the average of the probability distribution p3 and the probability distribution p4, a token which has a high probability of occurrence as the next token, to generate the question Q3.

In this configuration, the question generating section 32 may input, to the question generation model M, a plurality of pieces of text related to a single character string. For example, the question generating section 32, may input, to the question generation model M, the character string A3 and the piece of text P3, the character string A4 and the piece of text P3, and the character string A4 and the piece of text P4. In this case, the question generating section 32 generate a question with reference to a probability distribution (p5+p6+p7)/3, which is the average of a probability distribution p5, a probability distribution p6, and a probability distribution p7 which are calculated by inputting the respective inputs to the question generation model M.

Therefore, the question generating section 32 inputs, to the question generation model M, N pairs each being a pair of a character string and a piece of text and which are different from each other in character string, text, or both character string and text. The question generating section 32 then generates a question with reference to a probability distribution (p1+p2++pN)/N, which is the average of the probability distributions p1 to pN outputted from the question generation model M.

As above, the question generating section 32 generates a question with reference to the first intermediate information and the second intermediate information generated by a trained question generation model. Thus, the question generating section 32 is capable of accurately generating a question having answers which are a plurality of character strings.

Here is the description of a difference between the example process 2 and the technique disclosed in Patent Literature 1. The question generator in Patent Literature 1 is trained with use of a single-answer data set which includes a plurality of pairs each being a pair of a single question and a single answer. Accordingly, the question generator is not a model which has been trained so as to generate a question corresponding to a plurality of answers. Patent Literature 1 does not provide the details of how to generate a question having a plurality of answers with use of such a question generator. If a plurality of answers are inputted to this question generator (e.g., if a character string in which character strings corresponding to a plurality of answers are concatenated is inputted), the question outputted from the question generator is not necessarily a question corresponding to the plurality of answers.

In contrast, in the example process 2, the first character string and the second character string are not inputted at a time but are inputted separately, to a question generation model which receives a single answer as an input to output a single question. Further, in the example process 2, the first intermediate information obtained by inputting the first character string to the question generation model and the second intermediate information obtained by inputting the second character string are then used, so that a question having answers which are a plurality of character strings is generated. Thus, with the example process 2, by using a question generation model which receives a single answer as an input to output a single question, it is possible to more accurately generate a question having answers which are a plurality of character strings than with the technique disclosed in Patent Literature 1.

(Example Process 1 Carried Out by Ambiguity Judging Section 33)

Figure 8:
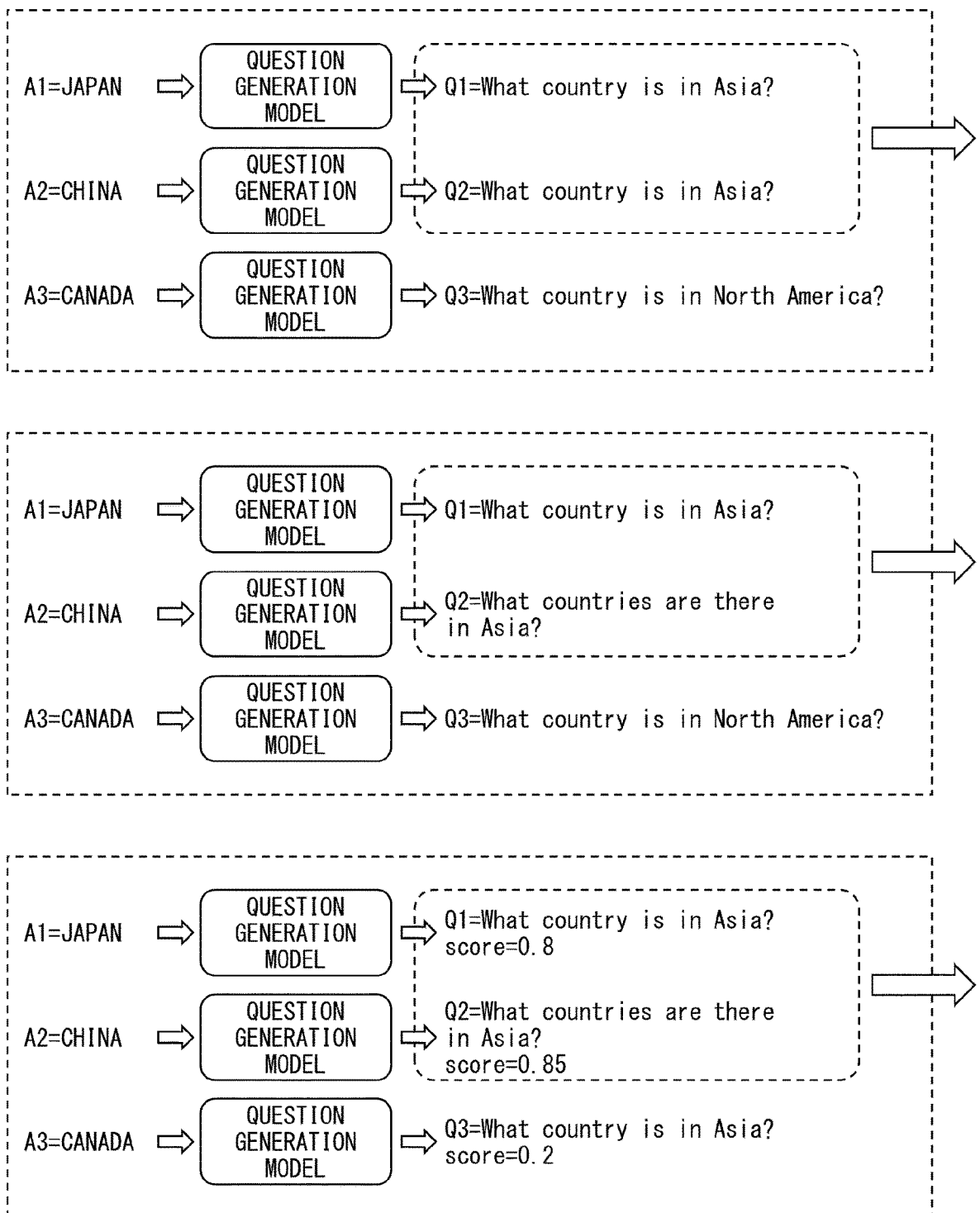
FIG. 8 is a diagram illustrating an example process carried out by an ambiguity judging section in accordance with the third example embodiment of the present invention.

An example process carried out by the ambiguity judging section 33 will be described with reference to FIG. 8. FIG. 8 is a diagram illustrating an example process carried out by the ambiguity judging section 33 in accordance with the present example embodiment.

For each of a plurality of questions generated by the question generating section 32, the ambiguity judging section 33 may treat, as the similarity, a degree to which the ordering of tokens which form that question and the ordering of tokens which form another question are similar to each other, to judge whether there are a plurality of answers to that question.

For example, in a case where, among a plurality of questions generated by the question generating section 32 such that each question has an answer different in character string from the answer of another question, there is a question having the same ordering of tokens as does another question, the ambiguity judging section 33 judges that there are a plurality of answers to such a question.

Assume, as an example, that the character string A1 "Japan" is inputted to the question generation model, and the question generating section 32 generates the question Q1 "what country is in Asia?", as illustrated on the upper side of FIG. 8. In addition, assume that the character string A2 "China" is inputted to the question generation model, and the question generating section 32 generates the question Q2 "what country is in Asia?", as illustrated on the upper side of FIG. 8. In this case, the question Q1 and the question Q2 are the same in terms of the ordering of tokens. Thus, the ambiguity judging section 33 judges that there are a plurality of answers to the question Q1. Further, in this case, the outputting section 34 outputs the question Q1. Furthermore, the outputting section 34 may output, together with the question Q1, the character string A1 "Japan" and the character string A2 "China", which are the answers.

In contrast, in a case where the character string A3 "Canada" is inputted to the question generation model, and the question generating section 32 generates a question Q3 "what country is in North America?", as illustrated on the upper side of FIG. 8, the question Q3 differs from the question Q1 and the question Q2 in the ordering of tokens. Thus, the ambiguity judging section 33 judges that there are not a plurality of answers to the question Q3. In other words, it can be said that the character string A3 "Canada" is inappropriate to an answer to the question Q1 "what country is in Asia?".

As above, in a case where there is a question having the same ordering of tokens as does another question, the ambiguity judging section 33 judges that there are a plurality of answers to such a question. Thus, the ambiguity judging section 33 is capable of accurately outputting a question having a plurality of answers.

(Example Process 2 Carried Out by Ambiguity Judging Section 33)

For each of the plurality of questions generated by the question generating section 32, the ambiguity judging section 33 may calculate a similarity which indicate a degree to which the ordering of tokens that form that question and the ordering of tokens that form another question are similar to each other, and when the similarity is equal to or higher than a threshold value, judge that there are a plurality of answers to that question. Examples of a configuration in which the ambiguity judging section 33 calculates the similarity include a configuration in which the above-described similarity function sim is used. The similarity function sim may have a configuration so as to calculate the cosine similarity between vectors in which two respective questions are embedded, as described above, or may have a configuration so as to calculate the degree of overlap of words between the two questions.

Assume, as an example, that the character string A1 "Japan" is inputted to the question generation model and the question generating section 32 generates the question Q1 "what country is in Asia?", as illustrated in the middle part of FIG. 8. In addition, assume that the character string A2 "China" is inputted to the question generation model, and the question generating section 32 generates the question Q2 "what countries are there in Asia?", as illustrated in the middle part of FIG. 8. In this case, the question Q1 and the question Q2 include the common words "Asia" and "country (countries)", the similarity between the question Q1 and the question Q2 becomes equal to or higher than the threshold value. Thus, the ambiguity judging section 33 judges that there are a plurality of answers to the question Q1. In this case, the outputting section 34 outputs the question Q1. Furthermore, the outputting section 34 may output, together with the question Q1, the character string A1 "Japan" and the character string A2 "China", which are the answers.

In contrast, in a case where the character string A3 "Canada" is inputted to the question generation model, and the question generating section 32 generates the question Q3 "what country is in North America?", as illustrated in the middle part of FIG. 8, the question Q3 and the question Q1 include the common word, which is "country" alone. In this case, the similarity between the question Q3 and the question Q1 becomes lower than the threshold value. Thus, the ambiguity judging section 33 judges that there are not a plurality of answers to the question Q3.

As above, in a case where there is a question similar in the ordering of tokens to another question, the ambiguity judging section 33 judges that there are a plurality of answers to the question. Thus, the ambiguity judging section 33 is capable of accurately outputting a question having a plurality of answers.

(Example Process 3 Carried Out by Ambiguity Judging Section 33)

In a case where the question generating section 32 calculates, in generating a question an answer to which is a character string, appropriateness (score) which indicates a degree to which the question is appropriate to the answer, the ambiguity judging section 33 may judge whether there are a plurality of answers to the question, with reference to the appropriateness. More specifically, in a case where, for each of the plurality of questions, the similarity between that question and another question is equal to or higher than the threshold value, the ambiguity judging section 33 judges whether there are a plurality of answers to that question, in accordance with whether the appropriateness of each of that question and the other question is equal to or higher than a threshold value. Described below as an example is a case where the threshold value of the score is "0.7".

Assume that the character string A1 "Japan" is inputted to the question generation model, the question generating section 32 generates the question Q1 "what country is in Asia?", and a score indicating appropriateness of "0.8" is outputted from the question generation model, as illustrated on the lower side of FIG. 8. In addition, assume that the character string A2 "China" is inputted to the question generation model, the question generating section 32 generates the question Q2 "what countries are there in Asia?", and a score of "0.85" is outputted, as illustrated on the lower side of FIG. 8. In this case, the similarity between the question Q1 and the question Q2 is equal to or higher than the threshold value, as described above.

Next, the ambiguity judging section 33 judges whether each of the score "0.8" and the score "0.85" is equal to or higher than the threshold value "0.7". Since each of the score "0.8" and the score "0.85" is equal to or higher than the threshold value, the ambiguity judging section 33 judges that there are a plurality of answers to the question Q1. In this case, the outputting section 34 outputs the question Q1. Furthermore, the outputting section 34 may output, together with the question Q1, the character string A1 "Japan" and the character string A2 "China", which are the answers.

Meanwhile, in a case where the character string A3 "Canada" is inputted to the question generation model, the question generating section 32 generates the question Q3 "what country is in Asia?", and a score of "0.2" is outputted, as illustrated on the lower side of FIG. 8, the similarity becomes equal to or higher than the threshold value because the question Q1 and the question Q3 are the same question.

Next, the ambiguity judging section 33 judges whether each of the score "0.8" and the score "0.2" is equal to or higher than the threshold value "0.7". Since the score "0.2" is not equal to or higher than the threshold value, the ambiguity judging section 33 judges that there are not a plurality of answers to the question Q3.

As above, in a case where there is a question similar in the ordering of tokens to another question, the ambiguity judging section 33 judges whether there are a plurality of answers to the question, in accordance with whether appropriateness is equal to or higher than the threshold value, the appropriateness indicating a degree to which each of the question and the other question is appropriate to the corresponding answer. Thus, in a case where there is a question similar to another question, when the appropriateness of the question and the appropriateness of the other question are high, the ambiguity judging section 33 judges that there are a plurality of answers to the question. Thus, the ambiguity judging section 33 is capable of accurately outputting a question having a plurality of answers.

(Example Process 4 Carried Out by Ambiguity Judging Section 33)

The ambiguity judging section 33 uses a question answering model which receives a question as an input to output an answer to the question, to judge whether there are a plurality of answers.

As an example, the ambiguity judging section 33 inputs, to a known question answering model, each of the plurality of questions generated by the question generating section 32. The ambiguity judging section 33 then judges whether the number of kinds of character strings outputted from the question answering model is greater than a threshold value. In a case where it has been judged that the number of kinds of character strings outputted from the question answering model is greater than the threshold value, the ambiguity judging section 33 judges that there are a plurality of answers to the inputted question.

In contrast, in a case where it has been judged that the number of kinds of character strings outputted from the question answering model is not greater than the threshold value, the ambiguity judging section 33 judges that there are not a plurality of answers to the inputted question.

As above, in a case where it has been judged that the number of kinds of character strings outputted from the question answering model is greater than the threshold value, the ambiguity judging section 33 judges that there are a plurality of answers to the inputted question. Thus, the ambiguity judging section 33 is capable of accurately outputting a question having a plurality of answers, with use of a known question answering model.

Software Implementation Example

Some or all of the functions of each of the question generation apparatuses 1, 2, and 3 may be implemented by hardware such as an integrated circuit (IC chip), or may be implemented by software.

Figure 9:
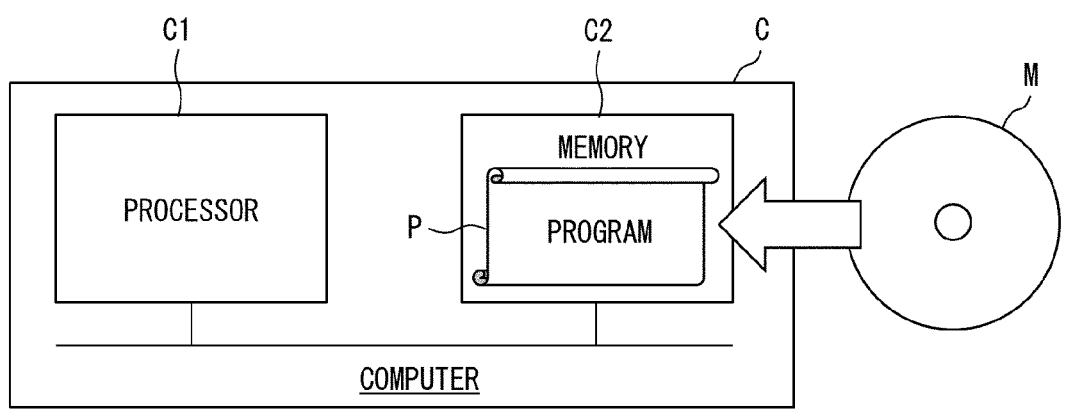
FIG. 9 is a block diagram illustrating an example hardware configuration of the question generation apparatus in accordance with each of the example embodiments of the present invention.

In the latter case, each of the question generation apparatuses 1, 2, and 3 is provided by, for example, a computer that executes instructions of a program that is software implementing the foregoing functions. An example (hereinafter, computer C) of such a computer is illustrated in FIG. 9. The computer C includes at least one processor C1 and at least one memory C2. The memory C2 has recorded thereon a program P for causing the computer C to operate as the question generation apparatuses 1, 2, and 3. The processor C1 of the computer C retrieves the program P from the memory C2 and executes the program P, so that the functions of the question generation apparatuses 1, 2, and 3 are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded when executed and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted via a transmission medium. Examples of such a transmission medium can include a communication network and a broadcast wave. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

The whole or part of the example embodiments disclosed above can be described as, but not limited to, the following supplementary notes.

Supplementary Note 1

A question generation apparatus including: an acquiring means for acquiring a plurality of character strings each of which can be an answer to a question and pieces of text respectively associated with the plurality of character strings; a question generating means for generating, with reference to the pieces of text, for each of the plurality of character strings, a question an answer to which is that character string; an ambiguity judging means for judging, for each of a plurality of questions generated by the question generating means, whether there are a plurality of answers to that question; and an outputting means for outputting a question which is included in the plurality of questions generated by the question generating means and which has been judged, by the ambiguity judging means, to be the question to which there are a plurality of answers.

Supplementary Note 2

The question generation apparatus described in supplementary note 1, in which for each of the plurality of questions generated by the question generating means, the ambiguity judging means judges whether there are a plurality of answers to that question, in accordance with a similarity which indicates a degree to which that question and another question are similar to each other.

Supplementary Note 3

The question generation apparatus described in supplementary note 1 or 2, in which the question generating means generates the question by inputting at least one character string of the plurality of character strings and a piece of text associated with the at least one character string, to a question generation model that has been trained so as to receive a single character string and a single piece of text as inputs and output a single question an answer to which is the character string.

Supplementary Note 4

The question generation apparatus described in supplementary note 1 or 2, in which: the question generating means generates the question with reference to first intermediate information and second intermediate information generated by a question generation model that has been trained so as to receive a single character string and a single piece of text as inputs and output a single question an answer to which is the single character string and that generates intermediate information indicating a predictive probability of an ordering of tokens which form a question to be outputted; the first intermediate information is generated by inputting, to the question generation model, a first character string of the plurality of character strings and a piece of text associated with the first character string; and the second intermediate information is generated by inputting, to the question generation model, a second character string of the plurality of character strings and a piece of text associated with the second character string, the second character string being different from the first character string.

Supplementary Note 5

The question generation apparatus described in any one of supplementary notes 1 to 4, in which each of the plurality of character strings acquired by the acquiring means is extracted from the piece of text associated with that character string.

Supplementary Note 6

The question generation apparatus described in supplementary note 2, in which for each of the plurality of questions generated by the question generating means, the ambiguity judging means treats, as the similarity, a degree to which an ordering of tokens which form that question and an ordering of tokens which form another question are similar to each other, to judge whether there are a plurality of answers to that question.

Supplementary Note 7

The question generation apparatus described in supplementary note 2 or 6, in which the question generation means calculates, in generating a question an answer to which is the character string, appropriateness which indicates a degree to which the question is appropriate to the answer; and the ambiguity judging means judges, for each of the plurality of questions, in a case where the similarity between that question and another question is equal to or higher than a threshold value, whether there are a plurality of answers to that question, in accordance with whether the appropriateness of each of that question and the other question is equal to or higher than a threshold value.

Supplementary Note 8

A question generation apparatus including: an acquiring means for acquiring at least one piece of text; a question generating means for generating, for each of a plurality of character strings which are extracted from the at least one piece of text and each of which can be an answer to a question, a question an answer to which is that character string; an ambiguity judging means for judging, for each of a plurality of questions generated by the question generating means, whether there are a plurality of answers to that question, in accordance with a similarity which indicates a degree to which that question and another question are similar to each other; and an outputting means for outputting a question which is included in the plurality of questions generated by the question generating means and which has been judged, by the ambiguity judging means, to be the question to which there are a plurality of answers.

Supplementary Note 9

A question generation method including: a question generation apparatus acquiring a plurality of character strings each of which can be an answer to a question and pieces of text respectively associated with the plurality of character strings; the question generation apparatus generating, with reference to the pieces of text, for each of the plurality of character strings, a question an answer to which is that character string; the question generation apparatus judging, for each of a plurality of questions generated in the generating, whether there are a plurality of answers to that question; and the question generation apparatus outputting a question which is included in the plurality of questions generated in the generating and which has been judged, in the judging, to be the question to which there are a plurality of answers.

Supplementary Note 9a

The question generation method described in supplementary note 9, in which in the judging, for each of the plurality of questions generated in the generating, whether there are a plurality of answers to that question is judged in accordance with a similarity which indicates a degree to which that question and another question are similar to each other.

Supplementary Note 10

A program for causing a computer to function as a question generation apparatus, the program causing the computer to function as: an acquiring means for acquiring a plurality of character strings each of which can be an answer to a question and pieces of text respectively associated with the plurality of character strings; a question generating means for generating, with reference to the pieces of text, for each of the plurality of character strings, a question an answer to which is that character string; an ambiguity judging means for judging, for each of a plurality of questions generated by the question generating means, whether there are a plurality of answers to that question; and an outputting means for outputting a question which is included in the plurality of questions generated by the question generating means and which has been judged, by the ambiguity judging means, to be the question to which there are a plurality of answers.

Supplementary Note 10a

The program described in supplementary note 10, in which the ambiguity judging means judges, for each of the plurality of questions generated by the question generating means, whether there are a plurality of answers to that question, in accordance with a similarity that indicates a degree to which that question and another question are similar to each other.

Supplementary Note 11

The question generation apparatus described in any one of supplementary notes 1 to 5, in which the question generating means refers to pieces of text respectively containing the plurality of character strings included in pieces of text stored in the text database, with the pieces of text respectively containing the plurality of character strings being treated as the pieces of text respectively associated with the plurality of character strings.

Supplementary Note 12

A question generation method including: a question generation apparatus acquiring at least one piece of text; the question generation apparatus generating, for each of a plurality of character strings which are extracted from the at least one piece of text and each of which can be an answer to a question, a question an answer of which is that character string; the question generation apparatus judging, for each of a plurality of questions generated in the generating a question, whether there are a plurality of answers to that question, in accordance with a similarity which indicates a degree to which that question and another question are similar to each other; the question generation apparatus outputting a question which is included in the plurality of questions generated in the generating and which has been judged, in the judging, to be the question to which there are a plurality of answers.

Supplementary Note 13

A program for causing a computer to function as a question generation apparatus, the program causing the computer to function as: an acquiring means for acquiring at least one piece of text; a question generating means for generating, for each of a plurality of character strings which are extracted from the at least one piece of text and each of which can be an answer to a question, a question an answer to which is that character string; an ambiguity judging means for judging, for each of a plurality of questions generated by the question generating means, whether there are a plurality of answers to that question, in accordance with a similarity which indicates a degree to which that question and another question are similar to each other; and an outputting means for outputting a question which is included in the plurality of questions generated by the question generating means and which has been judged, by the ambiguity judging means, to be the question to which there are a plurality of answers.

Supplementary Note 14

A question generation apparatus including at least one processor, the at least one processor carrying out: an acquiring process of acquiring a plurality of character strings each of which can be an answer to a question and pieces of text respectively associated with the plurality of character strings; a question generating process of generating, with reference to the pieces of text, for each of the plurality of character strings, a question an answer to which is that character string; an ambiguity judging process of judging, for each of a plurality of questions generated in the question generating process, whether there are a plurality of answers to that question; and an outputting process of outputting a question which is included in the plurality of questions generated in the question generating process and which has been judged, in the ambiguity judging process, to be the question to which there are a plurality of answers.

It should be noted that this question generation apparatus may further include a memory, and this memory may have stored therein a program for causing the at least one processor to carry out the acquiring process, the question generating process, the ambiguity judging process, and the outputting process. In addition, this program may be recorded on a computer-readable, non-transitory, and tangible recording medium.

Supplementary Note 15

A question generation apparatus including at least one processor, the at least one processor carrying out: an acquiring process of acquiring at least one piece of text; a question generating process of generating, for each of a plurality of character strings which are extracted from the at least one piece of text and each of which can be an answer to a question, a question an answer to which is that character string; an ambiguity judging process of judging, for each of a plurality of questions generated in the question generating process, whether there are a plurality of answers to that question, in accordance with a similarity which indicates a degree to which that question and another question are similar to each other; and an outputting process of outputting a question which is included in the plurality of questions generated in the question generating process and which has been judged, in the ambiguity judging process, to be the question to which there are a plurality of answers.

It should be noted that this question generation apparatus may further include a memory, and this memory may have stored therein a program for causing the at least one processor to carry out the acquiring process, the question generating process, the ambiguity judging process, and the outputting process. In addition, this program may be recorded on a computer-readable, non-transitory, and tangible recording medium.

REFERENCE SIGNS LIST 1, 2, 3: Question generation apparatus
11, 21, 31: Acquiring section
12, 22, 32: Question generating section
13, 23, 33: Ambiguity judging section
14, 24, 34: Outputting section

The invention claimed is:

1. A question generation apparatus comprising:
at least one processor, the at least one processor carrying out:
an acquiring process of acquiring a plurality of character strings each of which can be an answer to a question and pieces of text respectively associated with the plurality of character strings, the question having one or more answers, wherein the corresponding one of the plurality of character strings is included in the one or more answers;
a question generating process of generating, with reference to the pieces of text, a question for each of the plurality of character strings, the question having one or more answers, wherein each of the plurality of character strings is included in the one or more answers;
an ambiguity judging process for each question generated in the question generating process, of determining whether the one or more answers include another one of the plurality of character strings in addition to the corresponding character string, the determining comprising calculating a cosine similarity between vector embeddings of respective answers and judging the question as ambiguous when the cosine similarity is equal to or greater than a predetermined similarity threshold; and
an outputting process of outputting a question which is included in the plurality of questions generated in the question generating process and which has been judged, in the ambiguity judging process, to be the question to which there are a plurality of answers.

2. The question generation apparatus according to claim 1, wherein in the ambiguity judging process, for each of the plurality of questions generated in the question generating process, the at least one processor judges whether there are a plurality of answers to that question, in accordance with a similarity which indicates a degree to which that question and another question are similar to each other.

3. The question generation apparatus according to claim 1, wherein in the question generating process, the at least one processor generates the question by inputting at least one character string of the plurality of character strings and a piece of text associated with the at least one character string, to a question generation model that has been trained so as to receive a single character string and a single piece of text as inputs and output a single question an answer to which is the character string.

4. The question generation apparatus according to claim 1, wherein:
in the question generating process, the at least one processor generates the question with reference to first intermediate information and second intermediate information generated by a question generation model that has been trained so as to receive a single character string and a single piece of text as inputs and output a single question an answer to which is the single character string and that generates intermediate information indicating a predictive probability of an ordering of tokens which form a question to be outputted;
the first intermediate information is generated by inputting, to the question generation model, a first character string of the plurality of character strings and a piece of text associated with the first character string; and
the second intermediate information is generated by inputting, to the question generation model, a second character string of the plurality of character strings and a piece of text associated with the second character string, the second character string being different from the first character string.

5. The question generation apparatus according to claim 1, wherein each of the plurality of character strings acquired in the acquiring process is extracted from the piece of text associated with that character string.

6. The question generation apparatus according to claim 2, wherein in the ambiguity judging process, for each of the plurality of questions generated in the question generating process, the at least one processor treats, as the similarity, a degree to which an ordering of tokens which form that question and an ordering of tokens which form another question are similar to each other, to judge whether there are a plurality of answers to that question.

7. The question generation apparatus according to claim 2, wherein the at least one processor:
calculates, in the question generating process, in generating a question an answer to which is the character string, appropriateness which indicates a degree to which the question is appropriate to the answer; and
judges, in the ambiguity judging process, for each of the plurality of questions, in a case where the similarity between that question and another question is equal to or higher than a threshold value, whether there are a plurality of answers to that question, in accordance with whether the appropriateness of each of that question and the other question is equal to or higher than a threshold value.

8. A question generation method comprising:
at least one processor included in a question generation apparatus acquiring a plurality of character strings each of which can be an answer to a question and pieces of text respectively associated with the plurality of character strings, the question having one or more answers, wherein the corresponding one of the plurality of character strings is included in the one or more answers;
the at least one processor generating, with reference to the pieces of text, a question for each of the plurality of character strings, the question having one or more answers, wherein each of the plurality of character strings is included in the one or more answers;
the at least one processor for each question generated, determining whether the one or more answers include another one of the plurality of character strings in addition to the corresponding character string, the determining comprising calculating a cosine similarity between vector embeddings of respective answers and judging the question as ambiguous when the cosine similarity is equal to or greater than a predetermined similarity threshold; and
the at least one processor outputting a question which is included in the plurality of questions generated in the generating and which has been judged, in the judging, to be the question to which there are a plurality of answers.

9. A computer-readable, non-transitory recording medium having recorded thereon a program for causing a computer to function as a question generation apparatus, the program causing the computer to carry out:

an acquiring process of acquiring a plurality of character strings each of which can be an answer to a question and pieces of text respectively associated with the plurality of character strings, the question having one or more answers, wherein the corresponding one of the plurality of character strings is included in the one or more answers;

a question generating process of generating, with reference to the pieces of text, a question for each of the plurality of character strings, the question having one or more answers, wherein each of the plurality of character strings is included in the one or more answers;

an ambiguity judging process for each question generated in the question generating process, of determining whether the one or more answers include another one of the plurality of character strings in addition to the corresponding character string, the determining comprising calculating a cosine similarity between vector embeddings of respective answers and judging the question as ambiguous when the cosine similarity is equal to or greater than a predetermined similarity threshold; and an outputting process of outputting a question which is included in the plurality of questions generated in the question generating process and which has been judged, in the ambiguity judging process, to be the question to which there are a plurality of answers.

* * * * *